USO10543731B2

(12) United States Patent
Gruenberg et al.

(10) Patent No.: US 10,543,731 B2
(45) Date of Patent: Jan. 28, 2020

(54) AUXILIARY HVAC SYSTEM FOR A VEHICLE

(71) Applicant: Ford Global Technologies, LLC, Dearborn, MI (US)

(72) Inventors: Mark Gruenberg, Westland, MI (US); Jianqing Xu, Canton, MI (US); Shahid Bashir, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 324 days.

(21) Appl. No.: 13/768,303

(22) Filed: Feb. 15, 2013

(65) Prior Publication Data

US 2014/0230482 A1 Aug. 21, 2014

(51) Int. Cl.
  *B60H 1/00* (2006.01)

(52) U.S. Cl.
  CPC ..... *B60H 1/00021* (2013.01); *B60H 1/00207* (2013.01); *B60H 1/00485* (2013.01); *B60H 2001/00242* (2013.01)

(58) Field of Classification Search
  CPC ...... B60H 1/00371; B60H 2001/00221; B60H 1/00; B60H 1/00021; B60H 1/00485; B60H 1/00207; B60H 2001/00242; B60H 2001/00614; B60H 2001/00178; B60H 1/3229; B60H 1/3407
  USPC ... 62/209–211, 216–223, 244, 409–411, 419
  See application file for complete search history.

(56) References Cited

U.S. PATENT DOCUMENTS

| | | | | |
|---|---|---|---|---|
| 2,056,980 | A | * 10/1936 | Owen | B60H 1/00007 165/60 |
| 2,099,227 | A | * 11/1937 | Peo | B60H 1/3227 62/244 |
| 2,149,382 | A | * 3/1939 | Anderson | B61D 27/0018 454/99 |
| 2,195,388 | A | * 3/1940 | Schlumbohm | F25B 1/00 62/7 |
| 2,304,151 | A | * 12/1942 | Crawford | B61D 27/0018 62/86 |
| 2,449,437 | A | 9/1948 | Winchester et al. | |
| 2,479,170 | A | * 8/1949 | Kuempel | B60H 1/3226 62/230 |

(Continued)

FOREIGN PATENT DOCUMENTS

| | | |
|---|---|---|
| JP | 5118467 | 5/1993 |
| JP | 5157405 | 6/1993 |

*Primary Examiner* — Cassey D Bauer
*Assistant Examiner* — Kirstin U Oswald
(74) *Attorney, Agent, or Firm* — Vichit Chea; Brooks Kushman P.C.

(57) ABSTRACT

A system for decreasing the response time of a vehicle heating ventilation and air conditioning ("HVAC") system is described. A fan circulates air through a HVAC casing. Circulating air through the HVAC casing creates a high-pressure zone within the HVAC casing. A thermal expansion valve is located outside of the HVAC casing. An outlet port is located on the HVAC casing to allow air to be ported from the high-pressure zone toward the thermal expansion valve. Air ported from the high-pressure zone may be directed toward the thermal expansion valve by a nozzle. The air increases the temperature of the thermal expansion valve and allows additional refrigerant to flow through the thermal expansion valve.

7 Claims, 2 Drawing Sheets

(56) References Cited

U.S. PATENT DOCUMENTS

| | | | | |
|---|---|---|---|---|
| 3,218,821 | A | * | 11/1965 | Spatt .................. B60H 1/00371 62/244 |
| 3,314,248 | A | | 4/1967 | Baker et al. |
| 3,595,029 | A | * | 7/1971 | Lende, Jr. .......... B60H 1/00007 62/244 |
| 3,885,398 | A | * | 5/1975 | Dawkins .............. B60H 1/3204 62/89 |
| 4,117,773 | A | * | 10/1978 | Johnson .................. B66C 13/54 137/580 |
| 4,217,764 | A | * | 8/1980 | Armbruster .......... B60H 1/3226 62/239 |
| 4,272,967 | A | * | 6/1981 | White ..................... B64F 1/364 62/236 |
| 4,494,597 | A | * | 1/1985 | Fukami .............. B60H 1/00007 165/41 |
| 6,101,836 | A | * | 8/2000 | Yamada ............. B60H 1/00371 454/104 |
| 2005/0028542 | A1 | * | 2/2005 | Yoshida ............. B60H 1/00278 62/186 |
| 2005/0235668 | A1 | * | 10/2005 | Huang ................ B60H 1/0075 62/211 |
| 2009/0163131 | A1 | * | 6/2009 | Walkinshaw ........ B60H 3/0641 454/76 |
| 2015/0314666 | A1 | * | 11/2015 | Lukens ............. B60H 1/00457 454/76 |
| 2016/0146519 | A1 | * | 5/2016 | Ito ....................... F28D 1/05383 62/498 |

\* cited by examiner

AUXILIARY HVAC SYSTEM FOR A VEHICLE

TECHNICAL FIELD

The present invention relates to a heating ventilation and air conditioning system (hereinafter "HVAC system") having a thermal expansion valve.

BACKGROUND

A thermal expansion valve is used to control the amount of refrigerant that flows to an evaporator in an HVAC system. Refrigerant flows through the thermal expansion valve before flowing into the evaporator. The thermal expansion valve reduces refrigerant pressure and thus reduces refrigerant saturation temperature. After the thermal expansion valve, the refrigerant enters into the evaporator and absorbs the heat from the air passing through the evaporator. Cooled air blows into the cabin, and superheated refrigerant exits the evaporator and enters into the compressor. Then the refrigerant changes to liquid after passing through the condenser and flows into the thermal expansion valve again. This is a repeating cycle.

When no air is passing through the evaporator, the thermal expansion valve still modulates the open and close positions, responding to ambient temperatures. This results in a cold thermal expansion valve dome. Afterwards, if there is air passing through the evaporator, it takes time for the cold thermal expansion valve dome to warm up in order to function properly. This delays supplying cool air to the cabin. The rear auxiliary thermal expansion valve tends to have this problem because of the rear auxiliary HVAC system's location. The slow response of the rear thermal expansion valve increases the time required to initiate cooling by the rear auxiliary HVAC system and affects the comfort of rear seat vehicle occupants.

Thermal expansion valves are normally provided within the HVAC housing and are exposed to flowing air in the housing that is blown by an air circulation fan. The air blown by the fan actuates the thermal expansion valve, allowing the thermal expansion valve to function more quickly when a request for cooling is sent to the auxiliary HVAC system. The thermal expansion valve may be located outside the casing of the rear auxiliary HVAC system due to accessibility and maintenance issues relating to auxiliary HVAC systems. The external thermal expansion valve is not exposed to air flowing through the HVAC housing when a request for air conditioning is received. The thermal expansion valve may be frozen by the refrigerant in the valve resulting in slow response by the auxiliary HVAC.

This disclosure is directed to the above problems and other problems as summarized below.

SUMMARY

According to one aspect of this disclosure, an HVAC system is disclosed that includes a casing defining a high-pressure zone and a fan that circulates air through the high-pressure zone. The casing further defines an outlet port on the high-pressure zone, allowing air circulated by the fan to escape the high-pressure zone. Air from the high-pressure zone is directed toward a thermal expansion valve to increase the temperature of the thermal expansion valve. Increasing the temperature of the thermal expansion valve increases the pressure on a diaphragm within the thermal expansion valve and allows the refrigerant to flow more freely to an evaporator of the HVAC system. Allowing more refrigerant to flow through the valve and into the evaporator reduces the response time of the HVAC system. As a result, the vehicle is cooled at a faster rate to increase occupant comfort.

According to further aspects of this disclosure, the HVAC system may further include an air channeling device to direct the air across the thermal expansion valve. The air channeling device may be a nozzle. A sealing member may be disposed on the HVAC casing between the outlet port and the air channeling device. The sealing member reduces or prevents air from leaking from the casing between the outlet port and the air channeling device and prevents an undesired whistling noise.

According to another aspect of this disclosure, an apparatus is described for conditioning a thermal expansion valve. The device includes a HVAC casing defining a high-pressure zone, an outlet port disposed in the high-pressure zone of the auxiliary HVAC casing, and a nozzle disposed over the outlet port. A fan draws air into the HVAC casing and circulates it through the high-pressure zone. The outlet port on the high-pressure zone of the casing receives air from the HVAC casing. The nozzle may be attached to the outlet port to direct the air towards the thermal expansion valve.

The overall temperature of the thermal expansion valve is increased by directing the air across the thermal expansion valve. Increasing the temperature of the thermal expansion valve increases the pressure acting on a diaphragm within the thermal expansion valve. The increased pressure opens the valve and allows refrigerant to flow more freely through the thermal expansion valve. Increasing the flow of refrigerant reduces the response time for the thermal expansion valve and more quickly cools the passenger compartment of the vehicle.

According to another aspect of this disclosure, an HVAC system including an HVAC casing is disclosed that defines a high-pressure zone. A fan circulates air through the HVAC casing to create the high-pressure zone. An outlet port is defined on the HVAC casing at the high-pressure zone. Air is ported through the outlet port and is directed toward a thermal expansion valve by an air channeling device. The air channeling device directs the air across the thermal expansion valve. A sealing member may be provided between the air channeling device and the outlet port to prevent air leakage that may create a whistling noise.

Air escaping from the high-pressure zone flows across the thermal expansion valve to warm the thermal expansion valve. The increase in temperature of the thermal expansion valve opens a valve diaphragm and allows more refrigerant to flow through the thermal expansion valve. The response time of the HVAC system is reduced as more refrigerant flows through the thermal expansion valve. The vehicle cools at a faster rate to increase occupant comfort.

The above aspects of the disclosure and other aspects will be better understood in view of the attached drawings and the following detailed description of the illustrated embodiments.

DETAILED DESCRIPTION

The illustrated embodiments are disclosed with reference to the drawings. It should be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but merely as a representative basis for teaching one skilled in the art how to practice the disclosed concepts.

Figure 1:
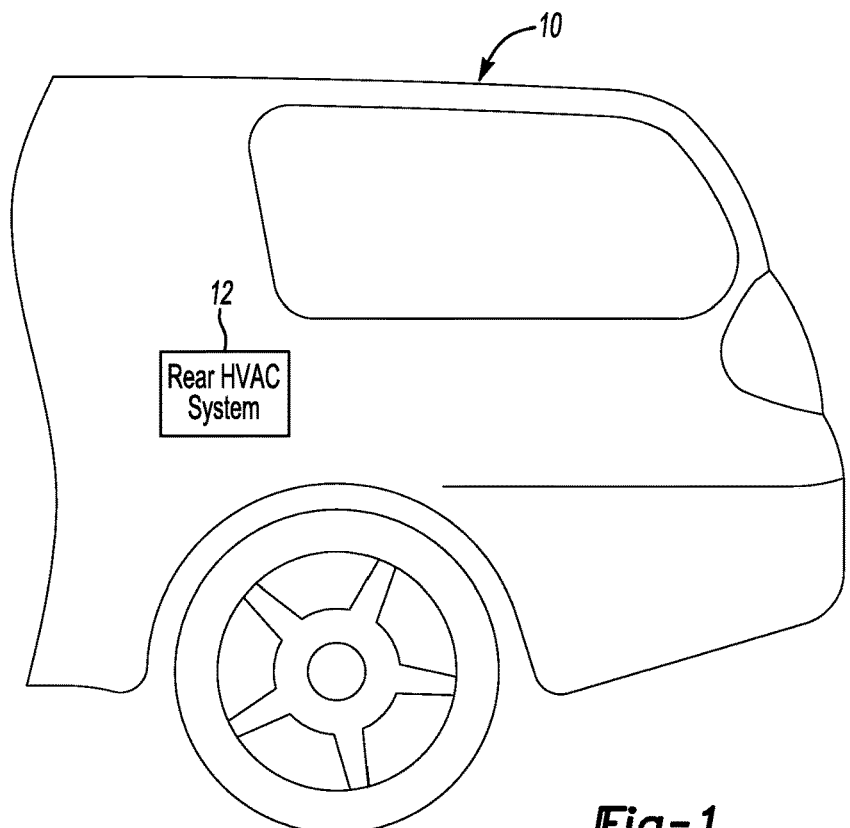
FIG. 1 is a fragmentary view showing the location of an auxiliary HVAC system in a vehicle.

Referring to FIG. 1, a vehicle 10 is provided with an HVAC system 12. The HVAC system 12 may be located in the rear of the vehicle 10. The HVAC system 12 cools the air prior to the air flowing into a passenger compartment of the vehicle 10. Air is cooled by refrigerant (not shown) flowing into the HVAC system 12.

Figure 2:
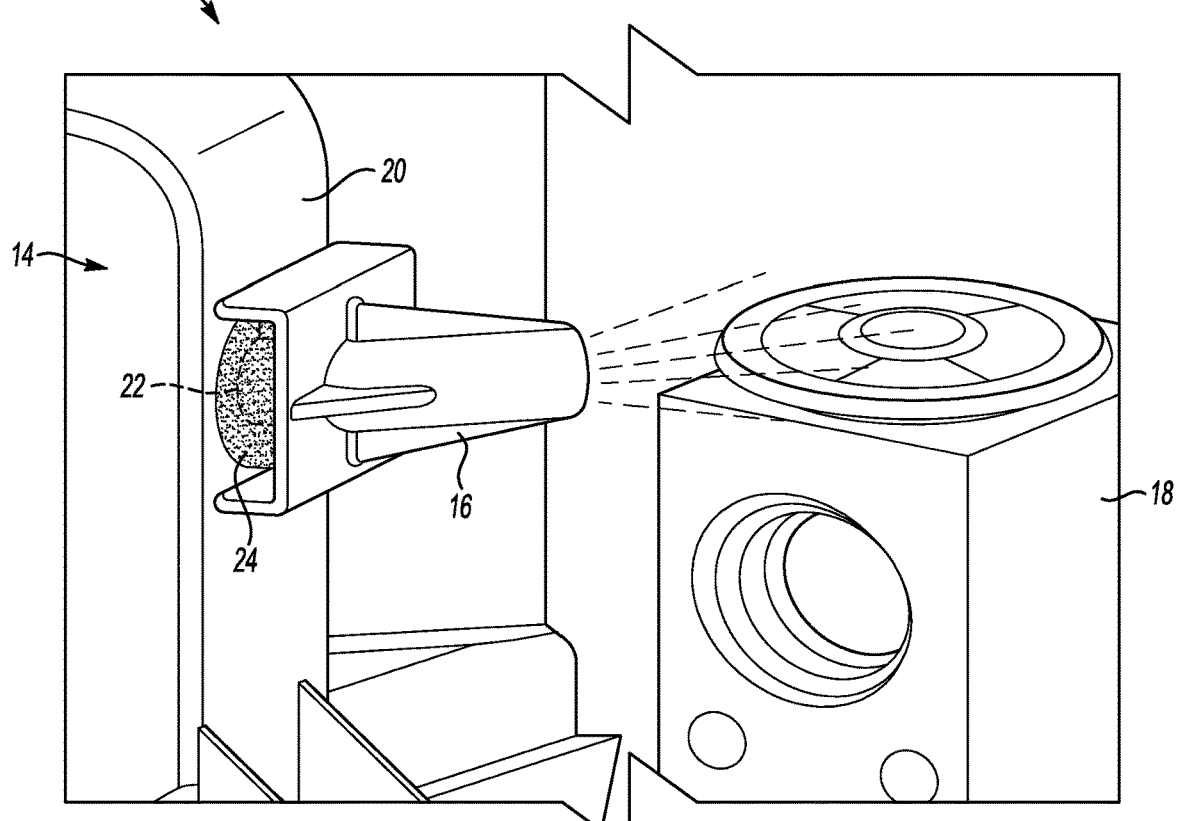
FIG. 2 is a fragmentary view of a nozzle directing air across a thermal expansion valve.

FIG. 2 illustrates the HVAC casing 14, the air channeling device 16, and a thermal expansion valve 18. The thermal expansion valve 18 regulates the amount of refrigerant flowing into the HVAC system 12. Refrigerant flowing through the thermal expansion valve 18 cools the valve 18. Cooling the thermal expansion valve 18 causes the thermal expansion valve's 18 pressure to drop and increases the response time of the system. A high-pressure zone 20 is created within the HVAC casing 14 by circulating air through the HVAC casing 14. An outlet port 22 is located on the HVAC casing 14 and is in fluid flow communication with the high-pressure zone 20. The outlet port 22 allows air to escape the high-pressure zone 20 and flow toward the thermal expansion valve 18. The air channeling device 16, such as a nozzle, directs air toward the thermal expansion valve 18. A seal 24 reduces any whistling effect caused by air leakage from the space between the outlet port 22 and the air channeling device 16.

Pressure in the thermal expansion valve 18 increases when the air is directed toward the thermal expansion valve 18. Increasing the pressure of the thermal expansion valve 18 allows the thermal expansion valve 18 to provide more refrigerant to the HVAC system 12. Allowing more refrigerant to flow more freely to the HVAC system 12 decreases the response time of the HVAC system 12. Decreasing the response time of the HVAC system 12 results in increased cooling of the passenger compartment and increased passenger comfort.

Figure 3:
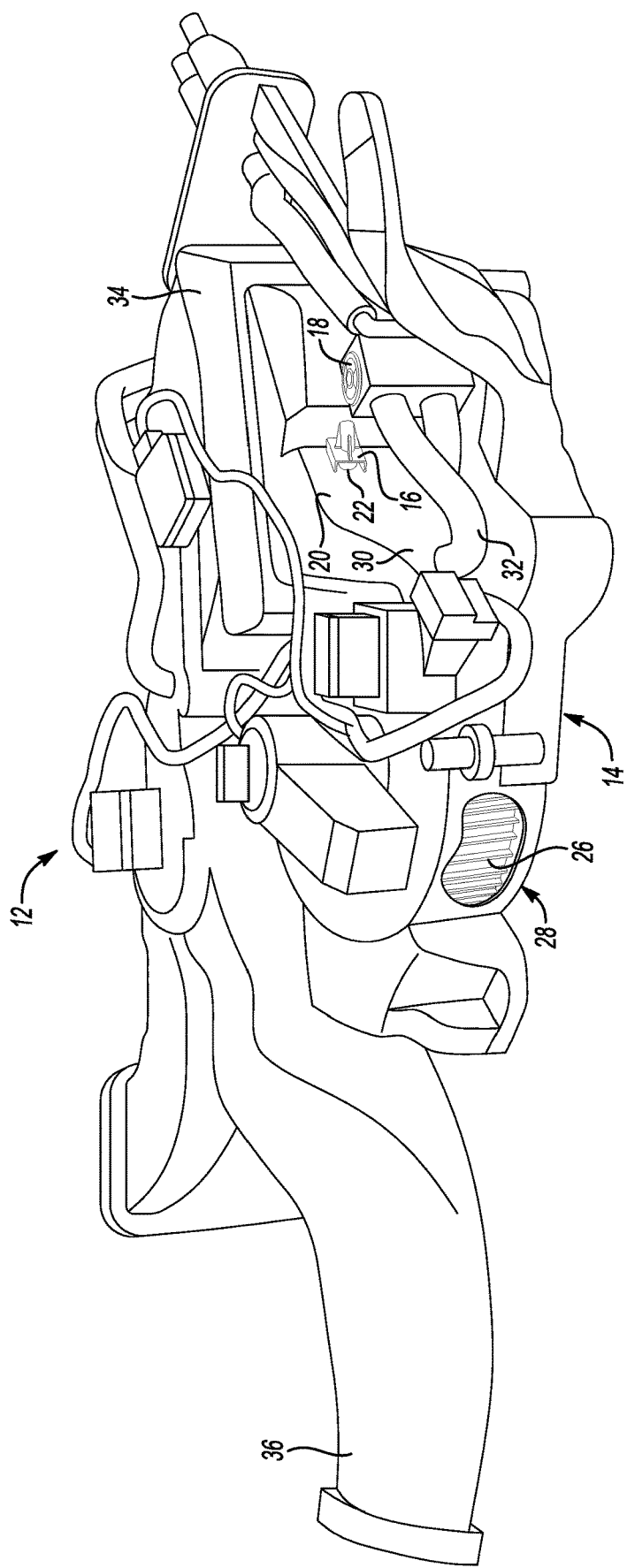
FIG. 3 is a perspective view showing the HVAC system.

FIG. 3 shows an HVAC apparatus that includes the HVAC casing 14. A fan 26 draws air into the HVAC casing 14 through an air inlet 28 into a low-pressure zone 30. A high-pressure zone 20 is created by the fan 26 circulating air through the HVAC casing 14. An outlet port 22 is defined on the high-pressure zone 20 of the casing allowing air to escape from the casing 14. An air channeling device 16, such as nozzle, directs the flow of the air escaping from the casing 14 across the thermal expansion valve 18.

The air flowing across the thermal expansion valve 18 makes the valve 18 respond more quickly when a request is received to activate the auxiliary HVAC system 12. Directing air from the high-pressure zone 20 across the thermal expansion valve 18 increases the temperature of the thermal expansion valve 18. Warming the thermal expansion valve 18 increases the pressure acting on a diaphragm (not shown) within the thermal expansion valve 18 and opens the valve 18 to allow more refrigerant to flow through a refrigerant circulation line 32 into the thermal expansion valve 18. Increasing refrigerant flow reduces the response time for the thermal expansion valve 18. The quicker response of thermal expansion valve 18 allows more refrigerant to flow into the evaporator 34. More refrigerant flowing into the evaporator 34 allows cooler air to be discharged through a vent 36, increasing occupant comfort.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A heating ventilation and air conditioning system comprising:
   a casing defining an outlet port;
   a fan that creates a pressure zone at the outlet port; and
   an air channeling device disposed over the outlet port and attached to the casing to channel air across a thermal expansion valve such that air contacts the thermal expansion valve disposed outside and at a distance from the air channeling device, wherein a thermal expansion valve temperature is increased.

2. The system of claim 1 wherein the air channeling device is a nozzle.

3. The system of claim 1 wherein a sealing member is disposed on the casing, surrounding the outlet port to reduce air leakage between the outlet port and the air channeling device.

4. A heating ventilation and air conditioning apparatus comprising:
   a casing for an evaporator;
   a fan that circulates air to create a pressure zone inside the casing;
   a thermal expansion valve disposed outside the casing that provides a refrigerant to the evaporator; and
   a nozzle in fluid flow communication with the pressure zone that directs air from the pressure zone across the thermal expansion valve such that the air contacts the thermal expansion valve to increase a thermal expansion valve temperature, wherein the thermal expansion valve is disposed outside and at a distance from the nozzle.

5. The apparatus of claim 4 further comprising a sealing member disposed between the nozzle and the casing to reduce air leakage between the nozzle and the casing.

6. An auxiliary heating ventilation and air conditioning apparatus for a rear portion of a passenger compartment of a vehicle, the apparatus comprising:
   a casing housing an evaporator, the casing defines an air inlet adapted to receive air at a first pressure zone
   a fan that circulates air from the first pressure zone to a second pressure zone;
   a thermal expansion valve disposed outside the casing;
   a nozzle disposed on the casing, that directs a portion of air from the second pressure zone across to contact the thermal expansion valve to increase a temperature of the thermal expansion valve, wherein the thermal expansion valve is disposed outside and at a distance from a nozzle body;
   at least one refrigerant circulation line that provides refrigerant to the evaporator through the thermal expansion valve; and
   at least one vent for discharging air after circulating through the evaporator to the rear portion of the passenger compartment of the vehicle.

7. The apparatus of claim 6 further comprising a seal disposed between the nozzle and the casing that prevents air from leaking from between the nozzle and the casing.

\* \* \* \* \*